United States Patent [19]

Nakao

[11] Patent Number: 4,513,330
[45] Date of Patent: Apr. 23, 1985

[54] ACCIDENTAL ERASING PREVENTATIVE DEVICE FOR A CASSETTE TAPE RECORDER

[75] Inventor: Toshihiro Nakao, Tokyo, Japan

[73] Assignee: Olympus Optical Co., Ltd., Tokyo, Japan

[21] Appl. No.: 350,292

[22] Filed: Feb. 19, 1982

[30] Foreign Application Priority Data

Feb. 24, 1981 [JP] Japan .............................. 56-25088[U]
Feb. 24, 1981 [JP] Japan .............................. 56-25089[U]

[51] Int. Cl.³ .............................................. G11B 15/04
[52] U.S. Cl. ...................................................... 360/60
[58] Field of Search ................................... 360/60, 137

[56] References Cited

U.S. PATENT DOCUMENTS 3,718,774  2/1973  Kosaka .................................. 360/60

*Primary Examiner*—Vincent P. Canney

*Attorney, Agent, or Firm*—Toren, McGeady and Stanger

[57] ABSTRACT

An accidental erasing preventive device is provided for a cassette tape recorder, which device includes a cassette compartment defined in a tape recorder body having therein, at least, a recording control circuit, the cassette compartment being arranged to be loaded with a tape cassette having in one lateral surface thereof at least one separatable accidental lock-out tab; an accidental erasing preventive lever disposed in a position opposing the accidental erasing lock-out tab of the tape cassette loaded in the cassette compartment, the accidental erasing preventive lever being arranged to rotate in a plane orthogonal to the bottom surface of the cassette chamber and detect the presence of the accidental erasing lock-out tab; and a resilient member biasing the accidental erasing preventive lever in the direction of allowing the latter to abut against the accidental erasing lock-out tab.

3 Claims, 3 Drawing Figures

ACCIDENTAL ERASING PREVENTATIVE DEVICE FOR A CASSETTE TAPE RECORDER

BACKGROUND OF THE INVENTION

1. Field of the Invention

The present invention relates to an accidental erasing preventive device provided in a tape recorder, and more particularly to an accidental erasing preventive device provided in a cassette tape recorder, for preventing accidental erasure of recorded signals on a tape contained in a tape cassette.

2. Description of Prior Art

There is provided in a cassette tape recorder an accidental erasing preventive device which detects the presence of an accidental erasing lock-out tab removably or separably disposed in a tape cassette when the latter is loaded in the cassette tape recorder, so as to control a recording circuit arranged in the cassette tape recorder.

There has been used an accidental erasing preventive device of this kind for a cassette tape recorder, including an accidental erasing preventive lever disposed opposite to an accidental erasing lock-out tab of a tape cassette loaded in a cassette compartment of the cassette tape recorder, the accidental erasing preventive lever being rotatable in a plane parallel to the bottom surface of the cassette compartment; a resilient member such as for example a coil spring, biasing the accidental erasing preventive lever toward the accidental erasing lock-out tab so that the lever abuts against the latter; and a recording circuit control switch disposed in the vicinity of the accidental erasing preventive lever so as to be actuated in response to rotation of the accidental preventive lever.

In such a conventional accidental erasing preventive device, when a tape cassette having accidental erasing lock-out tabs is loaded in the cassette compartment from the top of the latter, the accidental erasing preventive lever is forced, by the tape cassette, to rotate in the direction of overcoming the biasing force of the coil spring so that the accidental erasing preventive lever is withdrawn and then abuts against one of the accidental erasing lock-out tabs. Accordingly, the rotation of the accidental erasing preventive lever causes the recording circuit control switch to be turned, for example "OFF" so as to energize the recording circuit. When a cassette tape recorder with no accidental erasing lock-out tabs is loaded in the cassette compartment from the top of the cassette compartment, the accidental erasing preventive lever is transiently forced, by loading of the tape cassette, to rotate so as to move in the direction of overcoming the biasing force of the coil spring in a manner similar to that mentioned above. However, the biasing force of the coil spring returns the accidental erasing preventive lever until the latter enters into the tape cassette through one of the notches opened by the separation of the accidental erasing lock-out tabs, when the detecting end of the accidental erasing preventive lever is facing the notch. Therefore, the accidental erasing preventive lever is brought to the original position. Accordingly, the return of the lever allows the recording circuit control switch to be turned "ON" so as to hold the recording circuit deenergized, whereby accidental erasure of recorded signals is prevented.

In the above-mentioned conventional arrangement of the accidental erasing preventive device in which the accidental erasing preventive lever is rotated in a plane parallel to the bottom surface of the cassette compartment, that is, substantially orthogonal to the direction of the tape cassette loaded from the top of the compartment, it is disadvantageous that stable and reliable operation of accidental erasure protection cannot be expected, since the rotational direction of the accidental erasing preventive lever is completely different from the direction of the tape cassette insertion or loading which exerts unreasonable force on the lever so that not only smooth operation of the lever is hindered but also the lever is possibly damaged.

Further, the provision of the independent recording circuit control switch in the close vicinity of the accidental erasing preventive lever, which responds to the rotation of the latter, interferes with ultraminiaturization and cost reduction in cassette tape recorders, which are a recent trend, due to provision of a space for the switch to occupy and due to increase in the number of necessary parts for assembling the cassette tape recorders.

SUMMARY OF THE INVENTION

An object of the present invention is to eliminate the above-mentioned disadvantages in the conventional accidental erasing preventive devices for cassette tape recorders.

Namely, in a more concrete form, the present invention seeks to provide a unique accidental erasing preventive device for cassette tape recorders, which surely and reliably prevents accidental erasure of recorded signals on a tape contained in a tape cassette.

A further object of the present invention is to provide an accidental erasing preventive device capable of performing reliable accidental erasure protection, wherein rotation of an accidental erasing preventive lever is effected in a plane perpendicular to the bottom surface of a cassette compartment of a cassette tape recorder, that is, in the direction of the tape cassette insertion or loading, so that the rotation of the lever can be smoothly carried out.

Further, object of the present invention is to provide an accidental erasing preventive device of an ultraminiature size which may be economically priced by simplifying the construction thereof, due to elimination of a control switch for a recording circuit in a cassette tape recorder by assigning, instead, a switching function for the recording circuit to a resilient member arranged to provide a biasing force to an accidental erasing preventive lever.

According to the present invention, there is provided an accidental erasing preventive device disposed in a cassette tape recorder body which includes, at least, a recording control circuit, comprising a cassette compartment loaded with a tape cassette having accidental erasing lock-out tabs which are separately incorporated in one lateral surface of the cassette, an accidental erasing preventive lever in opposite relation to one of the accidental erasing lock-out tabs of the tape cassette loaded in the cassette compartment, and arranged to rotate in a plane orthogonal to the bottom surface of the cassette compartment so as to detect the presence of the accidental erasing lock-out tab, and a resilient member biasing the lever in the direction of abutting the lock-out tab.

According to one preferred embodiment of the present invention, the above-mentioned accidental erasing preventive lever is made of electrically insulating materials, and has, at its base end, a cylindrical member for rotatably supporting the lever itself and a forward end for detecting the presence of the accidental erasing lock-out tab of the tape cassette loaded in the cassette compartment.

The above-mentioned resilient member is electrically conductive and is connected, at its one end, to the above-mentioned recording control circuit while, at the other end, can be connected to another circuit in response to the rotation of the accidental erasing preventive lever. Further, the resilient member is a coil spring surrounding the above-mentioned cylindrical member of the accidental erasing preventive lever. In case that the accidental erasing preventive lever is made of electrically condutive materials, the resilient member is covered with an insulating material.

BRIEF DESCRIPTION OF THE DRAWINGS

These and other advantages of the present invention will be more readily apparent from a consideration with the accompanying drawings in which.

DESCRIPTION OF THE PREFERRED EMBODIMENT

Figure 1:
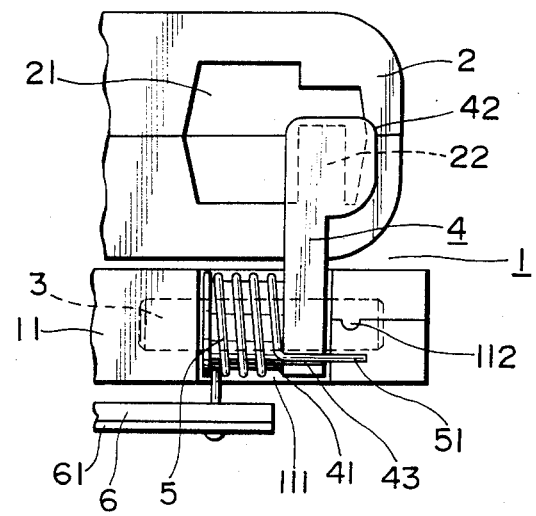
FIG. 1 is a schematic view illustrating one embodiment of the present invention.
Figure 2:
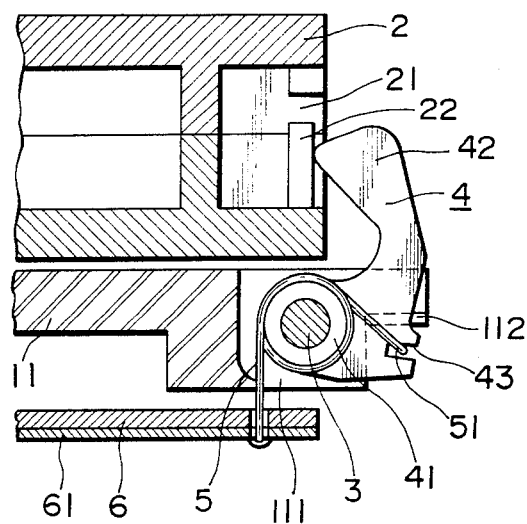
FIG. 2 is a schematic view illustrating the embodiment shown in FIG. 1, in which a tape cassette having an accidental erasing lock-out tab is illustrated for explaining the relation with the embodiment of the present invention.

In FIG. 1, reference numeral 1 denotes a cassette compartment of a cassette tape recorder body (not shown) having a recording control circuit disposed therein, into which a tape cassette 2 is loaded. The tape cassette 2 has, in one lateral surface thereof, a notch portion 21 in which a separatable accidental erasing lock-out tab 22 is provided, as shown in a dotted line in FIG. 1. A base plate 11 defining the bottom surface of the cassette compartment 1 is formed with an cut-out portion 111 in a position corresponding to the accidental erasing lock-out tab 22 of the tape cassette 2 loaded in the cassette compartment 1. A supporting shaft 3 is extended across this cut-out portion 111. An accidental erasing preventive lever 4 has a forward end portion 42 for detecting the presence of the accidental erasing lock-out tab 22 of the tape cassette 2 and, at its base end portion, a cylindrical member 41 through which the supporting shaft 3 extends so as to support the accidental erasing preventive lever 4 rotatably in a plane orthogonal to the bottom surface of the cassette compartment 1. In this embodiment, the accidental erasing preventive lever 4 is made of insulating materials such as for example synthetic resin materials.

A resilient member such as for example a coil spring 5 is disposed, surrounding the cylindrical member 41 and biases the lever 4 toward the accidental erasing lock-out tab 22 so that the forward end portion 42 of the lever 4 abuts against the lock-out tab 22. This spring 5 is made of highly electrically conductive materials, is fitted, at its one end, to a print circuit substrate 6 arranged on the base plate 11 of the cassette compartment 1 so as to be electrically connected to a recording control circuit 61 on the substrate 6, and is also engaged, at its other end, in the groove 43 formed in the back portion of the accidental erasing preventive lever 4. This other end of the coil spring 5 has an extension 51 by which this end can be easily extended to be disengaged from the groove 43. This extension 51 is so arranged to make it possible, upon rotation of the accidental erasing preventive lever 4, to abut against a catch portion 112 formed in the base plate 11 which also carries another circuit, for example a ground circuit in this embodiment. Since the catch portion 112 receives the extension 51 of the coil spring 5, it serves as a stopper for limiting rotation of the accidental erasing preventive lever 4.

Due to the above-mentioned construction of the accidental erasing preventive device, when the tape cassette 2 is loaded from the top of the cassette compartment 1, the accidental erasing preventive lever 4 is forcedly rotated by the tape cassette 2. Since this rotation of the lever 4 is made in a plane orthogonal to the bottom surface of the cassette compartment 1, that is, in the direction of the tape cassette insertion or loading, smooth rotation can be obtained without any unreasonable force exerted on the lever 4. Therefore, reliable and precise operation can be expected by the accidental erasing preventive device of the above-mentioned construction.

Further, if the tape cassette thus loaded has an accidental erasing lock-out tab 22, the accidental erasing preventive lever 4 is positioned such that the forward end portion 42 of the lever 4 is urged by the biasing force of the coil spring 5 so as to abut against the accidental erasing lock-out tab 22. In this state, since the extension 51 of the coil spring 5 is separated from the catch portion 112 of the base plate 11, the electrical connection between the recording control circuit 61 and the ground circuit is broken to establish the "OFF" condition. Therefore, it the recording control circuit 61 is of the type which establishes a recording mode when the ground circuit is disconnected, it is set in the recording mode.

Figure 3:
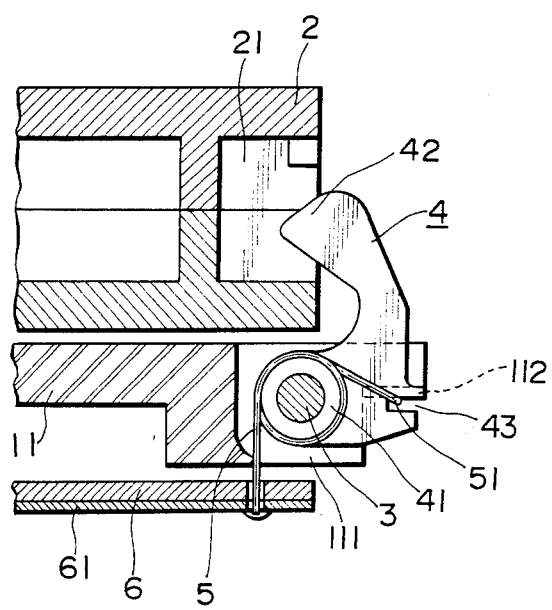
FIG. 3 is a schematic view illustrating the same arrangement shown in FIG. 2, except that the accidental erasing lock-out tab is removed from the tape cassette.

If the accidental erasing lock-out tab 22 of the tape cassette 2 loaded in the cassette compartment 1 is removed or separated, the accidental erasing preventive lever 4 is positioned such that the extension 51 of the coil spring 5 abuts against the catch portion 112 of the base plate 11 while the forward end portion 42 is urged into the notch portion 21 of the tape cassette 2 by the biasing force of the coil spring 5, as shown in FIG. 3. Accordingly, contact between the extension 51 of the coil spring 5 and the catch portion 112 of the base plate 11 allows the electrical connection between the recording control circuit 61 and the ground circuit to establish "ON" condition through the coil spring 51. Therefore, the recording circuit 61 is set in a null mode.

Due to the above-mentioned construction, tape cassette insertion or loading allows the accidental erasing preventive lever for detecting the presence of the accidental erasing lock-out tab of the tape cassette to rotate smoothly, without exerting any unreasonable force, since the accidental erasing preventive lever can be rotated in a plane orthogonal to the bottom surface of the cassette compartment, that is, in the direction of the cassette insertion or loading. Further, since the possible smooth rotation of the lever eliminates damage to the lever itself so as to increase the durability and life thereof, there is obtained highly reliable operation of accidental erasure protection.

Furthermore, the "ON"-"OFF" control switching function can be actuated by the electrically conductive coil spring through which the recording control circuit can be connected to the ground circuit in response to the rotation of the accidental erasing preventive lever. Therefore, the arrangement of the present invention can be simple and eliminate a separate control switch occupying a space in the accidental erasing preventive device, which allows the device to be miniaturized and to reduce its cost. Accordingly, the accidental erasing preventive device of the present invention can greatly contribute to ultraminiaturization and cost reduction in a cassette tape recorder.

While an illustrative embodiment of the present invention has been described herein, modifications and adaptations thereof may be made by those skilled in the art without departure from the sprit and scope of the present invention as defined by the following claims. For example, although the accidental erasing preventive lever having a cylindrical base portion around which the electrically conductive spring is disposed, is made of insulating materials in the described embodiment, the accidental erasing preventive lever may be made of electrically conductive materials, in which case the coil spring is covered with an insulating material such as for example rubber.

What is claimed is:

1. A cassette tape recorder equipped with an accidental erasure preventive device comprising:
   means defining a cassette compartment having a bottom side arranged to receive therein a tape cassette having in one lateral surface thereof at least one removable accidental erasure preventing lockout tab;
   erasure-recording means for simultaneously erasing information recorded on tape contained within a tape cassette inserted into said cassette compartment and for recording other information thereon;
   erasure-recording contact circuit means for controlling operation of said erasure-recording means, said control circuit means including switch means for preventing erasure and recording of information from and on said tape;
   lever means disposed in a position to engage a lockout tab of a cassette inserted in said cassette compartment, said lever means being arranged to rotate for engagement with said lockout tab, said lever means being adapted to occupy a first position when a cassette inserted in said cassette compartment has a lockout tab thereon and a second position when a cassette inserted in said cassette compartment does not have a lockout tab thereon; and
   spring means rotatively biasing said lever means in a direction toward engagement with a lockout tab of a cassette inserted in said cassette compartment and for simultaneously cooperating with said switch means to render said erasure-recording means inoperative to erase and record information when said lever means is in one of said first and said second positions and to enable erasure and recording by said erasure-recording means when said lever means is in the other of said first and second positions; and wherein
   said spring means comprise an electrically conductive member having one end thereof electrically connected with said erasure-recording control circuit means and the other end thereof adapted to be brought into and out of conductive engagement with said switch means in response to the position of said lever means.

2. A recorder according to claim 1 wherein said spring means comprises a coil spring, wherein said erasure-recording control circuit means comprise a printed circuit board, said coil spring having one end electrically connected to said printed circuit board and an opposite end engaged with said lever means to effect said rotative biasing of said lever means, said opposite end of said coil spring being adapted to be brought into and out of electrical contact with said switch means in accordance with the position of said lever means determined by the presence or absence of said lockout tab in a cassette inserted in said cassette compartment.

3. A recorder according to claim 1 wherein said switch means comprise an electrically conductive member forming part of said erasure-recording control circuit means, wherein said spring means comprises a first end connected in permanent electrical engagement with said erasure-recording control circuit means and a second end adapted to be brought into and out of electrical contact with said switch means to open and close a circuit depending upon the position of said lever means, said spring means operating to be brought into electrical contact with said switch means when a cassette inserted into said cassette compartment does not contain a lockout tab and to be maintained out of electrical contact with said switch means when a cassette inserted into said cassette compartment does contain a lockout tab.

* * * * *